United States Patent
Yoshino et al.

(10) Patent No.: US 6,251,046 B1
(45) Date of Patent: Jun. 26, 2001

(54) AUTOMATIC ENGINE-STOP CONTROL APPARATUS FOR INTERNAL COMBUSTION ENGINE

(75) Inventors: Takahiro Yoshino, Kanagawa; Yuki Nakajima, Yokohama; Hiroaki Ogane; Masaaki Uchida, both of Kanagawa, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/501,597

(22) Filed: Feb. 10, 2000

(30) Foreign Application Priority Data

Feb. 10, 1999 (JP) .................................................. 11-032438

(51) Int. Cl.$^7$ .................................................. B60K 41/20
(52) U.S. Cl. ............................. 477/187; 477/205; 701/112
(58) Field of Search .......................... 701/112; 477/183, 477/187, 205

(56) References Cited

U.S. PATENT DOCUMENTS 4,539,643 * 9/1985 Suzuki et al. .................. 364/431.09
4,630,577 * 12/1986 Cornacchia ....................... 123/179 B

FOREIGN PATENT DOCUMENTS 8-291725    11/1996  (JP) .

* cited by examiner

*Primary Examiner*—Dirk Wright
(74) *Attorney, Agent, or Firm*—Foley & Lardner

(57) ABSTRACT

An automatic engine-stop control apparatus for a vehicle includes a vehicle speed sensor and a brake pedal depression sensor which are coupled to a control unit. The control unit is programmed to decide that the vehicle speed detected by the vehicle speed sensor is smaller than or equal to a predetermined stop expected speed when the brake pedal depression sensor detects that the brake pedal is depressed, and to decide that the vehicle is stopped when a predetermined time period elapses from a moment that the vehicle speed becomes smaller than or equal to the predetermined stop expected speed and when the depression of the brake pedal is continued.

12 Claims, 6 Drawing Sheets

EMBODIMENT 1

AUTOMATIC ENGINE-STOP CONTROL APPARATUS FOR INTERNAL COMBUSTION ENGINE

BACKGROUND OF THE INVENTION

The present invention relates to an apparatus for automatically stopping an internal combustion engine when a vehicle equipped with the engine is stopped.

Japanese Patent Provisional Publication No. 8-291725 discloses an automatic engine stop and start apparatus applied to a vehicle equipped with an internal combustion engine and an automatic transmission.

SUMMARY OF THE INVENTION

However, this conventional apparatus is arranged to decide that the vehicle speed is zero on the basis of a signal from a vehicle speed sensor. Accordingly, if a detection limit of the vehicle speed sensor is not so high, there is a possibility that the vehicle speed sensor outputs a zero-speed indicative signal even when an actual vehicle speed is not zero. Further, on the basis of this incorrect zero-speed decision of the vehicle speed, the conventional apparatus will execute an automatic engine-stop operation by stopping the supply of fuel to the engine. Accordingly, the driving force of the engine is suddenly decreased during a braking of the vehicle. Consequently, the braking force is radically increased by this sudden engine stop to increase a deceleration of the vehicle, and therefore a driver of this vehicle has discomfort. Further, the vehicle will be stopped at a point that is nearer than a point intended by the driver.

It is therefore an object of the present invention to provide an improved automatic engine stop control apparatus that is arranged to suitably solve the above-mentioned problems.

An automatic engine-stop control apparatus according to the present invention is for an internal combustion engine of a vehicle. The automatic engine stop control apparatus comprises a vehicle speed sensor and a brake pedal depression sensor which are coupled to a control unit. The control unit is programmed to decide that the vehicle speed detected by the vehicle speed sensor is smaller than or equal to a predetermined stop expected speed when the brake pedal depression sensor detects that the brake pedal is depressed and to decide that the vehicle is stopped when a predetermined time period elapses from a moment that the vehicle speed becomes smaller than or equal to the predetermined stop expected speed and when the depression of the brake pedal is continued.

DETAILED DESCRIPTION OF THE INVENTION

Figure 1:
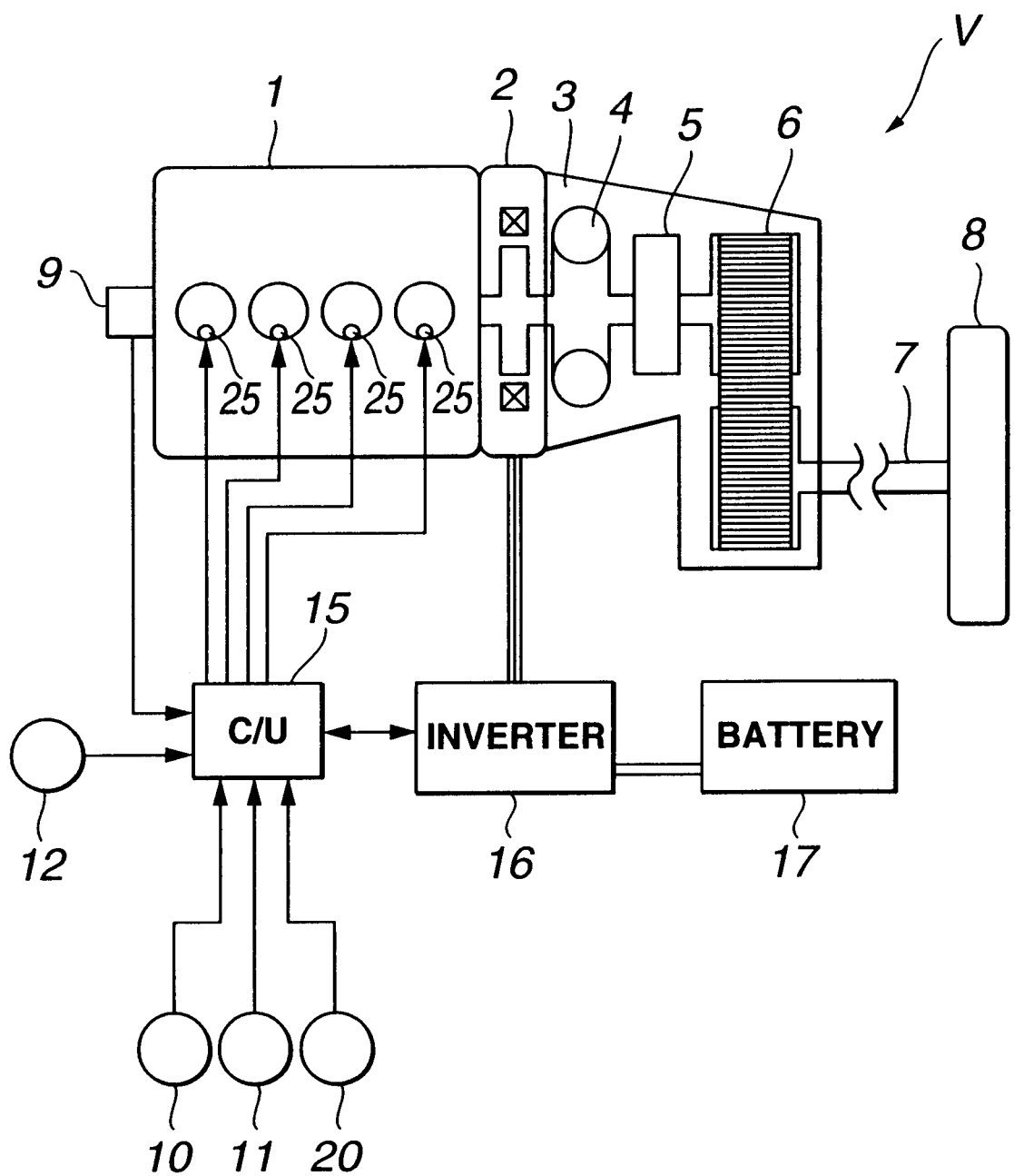
FIG. 1 is a schematic view showing a construction of first to third embodiments of an automatic engine-stop control apparatus according to the present invention.
Figure 2:
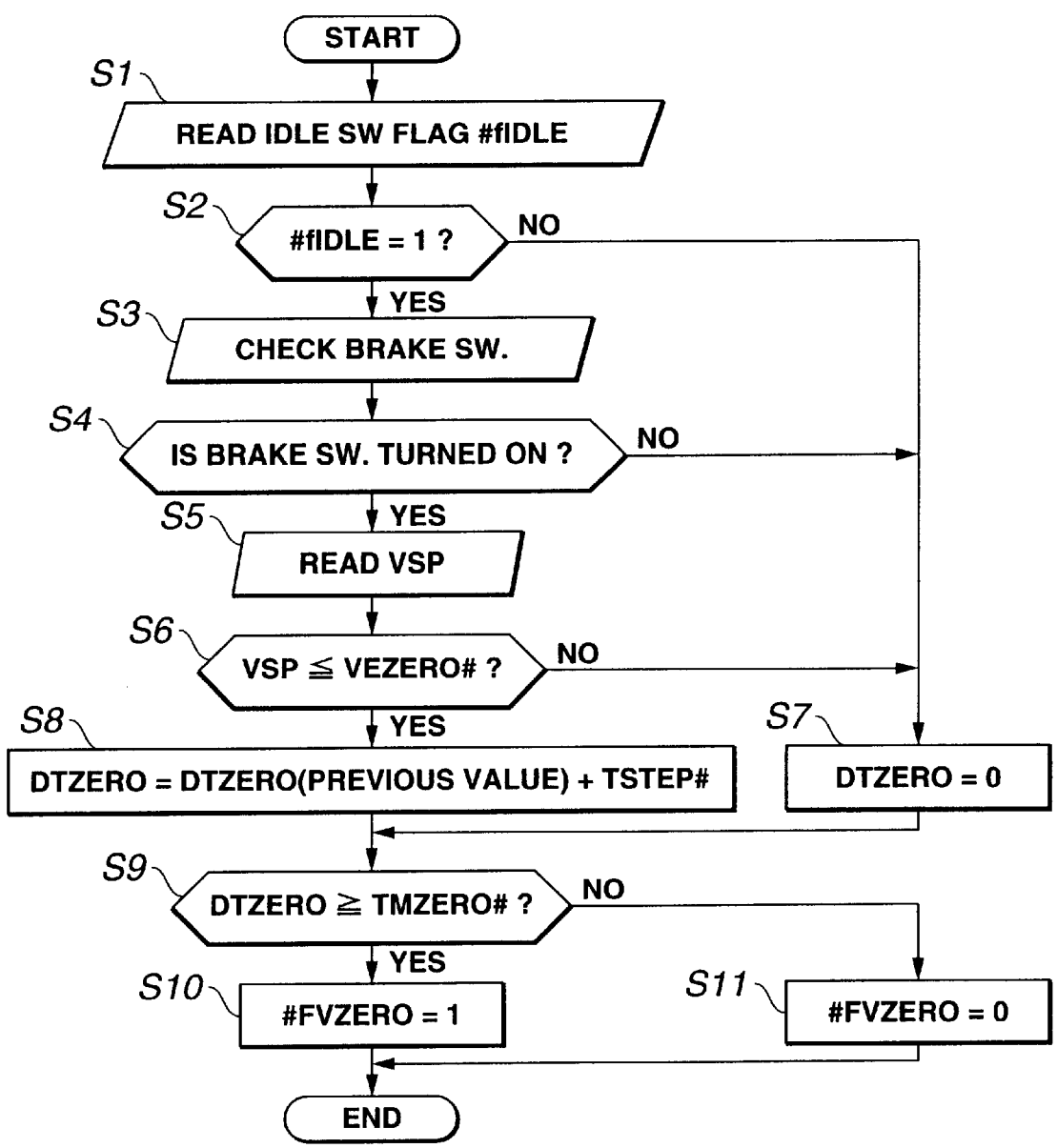
FIG. 2 is a flowchart showing an automatic engine-stop control employed in the first embodiment according to the present invention.
Figure 3:
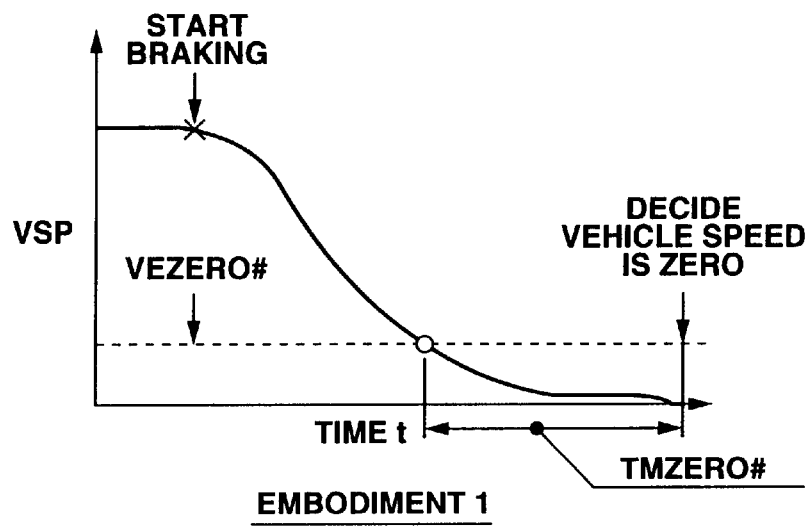
FIG. 3 is a time chart explaining the operation of the vehicle employing the automatic engine stop control apparatus of the first embodiment.

Referring to FIGS. 1 to 3, there is shown a first embodiment of an automatic engine-stop control apparatus according to the present invention.

As shown in FIG. 1, an internal combustion engine 1 for a vehicle V is connected to a continuously variable transmission (CVT) 3 through a motor generator 2 which functions as a generator and an electric motor. The motor generator 2 is in direct connection with a crankshaft (not shown) of the engine 1 and is synchronously rotated with the engine 1. The CVT 3 comprises a torque converter 4, a forward/reverse selector clutch 5 and a belt type continuously variable transmission (BTCVT) 6, as schematically shown in FIG. 1. Drive torque of the engine 1 is transmitted to a drive shaft 7 and tires 8 through the CVT 3.

Although the first embodiment is arranged such that the motor generator 2 is in direct connection with the engine 1, the motor generator 2 may be connected to the engine 1 through a belt mechanism or chain mechanism. Further, a multi-speed automatic transmission may be employed instead of the BTCVT 6.

A control unit (controller) 15 comprises a microcomputer basically constituted by CPU, ROM, RAM, A/D converter, and Input/Output interface. The control unit 15 is coupled to various sensors and receives various input signals for detecting information indicative of vehicle condition.

The various sensors include a rotation speed sensor 9 for detecting a rotation speed of the engine 1 and the motor generator 2 and outputting a signal indicative of the rotation speed, a vehicle 10 speed sensor 10 for detecting a vehicle speed VSP of the vehicle V and outputting a signal indicative of the vehicle speed, an accelerator opening sensor 11 for detecting a depression amount of an accelerator pedal (not shown) and outputting a signal indicative of the depression amount, a brake switch 12 for detecting whether a brake pedal (not shown) is depressed or not and outputting a signal indicative of the decision as to the depression of the brake pedal, and a brake pressure sensor 20 for detecting a brake pressure PBRAKE of brake hydraulic operated in a braking system and outputting a signal indicative of the brake pressure PBRAKE. The depression amount detected by the accelerator opening sensor 11 corresponds to an accelerator opening.

The control unit 15 is coupled to fuel injectors 25 of the engine 1 and controls fuel injection quantity and timing of each fuel injector 25 on the basis of signals from the above-mentioned various sensors and control programs previously stored in the control unit 15. Further, the control unit 15 executes a decision as to whether the vehicle V is running or stopping and an automatic stop control of the engine 1 on the basis of this decision and control programs stored in the control unit 15. Furthermore, the control unit 15 executes a start control of the engine 1. More specifically, the control unit 15 outputs a target torque and a target rotation speed of the motor generator 2 to execute the drive or generation of the motor generator 2 through an inverter 16 to start the operation of the engine 1. The inverter 16 is connected to a battery 17 for supplying and receiving electric energy to and from the motor generator 2 through the inverter 16.

Next, the automatic engine-stop control of the engine 1 executed by the control unit 15 will be discussed with reference to a flowchart of FIG. 2. The flowchart of FIG. 2 schematically shows a control program of the automatic engine-stop control and includes a decision routine for deciding whether the vehicle is running or not. This decision routine is employed to execute the automatic stop of the engine 1. This routine is implemented at predetermined control cycles after the engine 1 is warmed up.

At a step S1, the control unit 15 reads an idle SW flag #fIDLE indicative of a depressed condition of the accelerator pedal. More specifically, if the accelerator pedal is depressed, that is, when the engine 1 is not put in an idling condition, the flag is set at 0 (#fIDLE=0). If not, that is, when the engine 1 is put in the idling condition, the flag is set at 1 (#fIDLE=1).

At a step S2, the control unit 15 decides whether the engine 1 is put in the idling condition or not. When the decision at the step S2 is affirmative (#fIDLE=1), the routine proceeds to a step S3. When the decision at the step S2 is negative (#fIDLE=0), the routine proceeds to a step S7.

At the step S3, the control unit 15 checks a condition of the brake switch 12.

At the step S4, the control unit 15 decides whether the brake switch 12 is turned on or not. When the decision at the step S4 is affirmative, the routine proceeds to a step S5. When the decision at the step S4 is negative, the routine proceeds to the step S7.

At the step S5 following to the affirmative decision at the step S4, the control unit 15 reads a vehicle speed VSP from the vehicle speed sensor 10.

At the step S6, the control unit 15 decides whether or not the vehicle speed VSP is smaller than or equal to a predetermined stop expected speed VEZERO#. In this embodiment, the predetermined stop expected speed VEZERO#, at which it is expected that the vehicle will be stopped, is set within a range from 1 to 2 km/h. When the decision at the step S6 is affirmative, the routine proceeds to a step S8. When the decision at the step S6 is negative, the routine proceeds to the step S7.

At the step S7 following to the negative decision at the step S2, S4 or S6, the control unit 15 resets a counted time DTZERO of a timer provided in the control unit 15 at zero (DTZERO=0). That is, when the accelerator pedal is depressed, when the brake pedal is not depressed, or when the detected vehicle speed VSP is greater than the stop expected speed VEZERO#, the routine proceeds to the step S7 wherein the timer is reset so that the counted time (DTZERO) is reset at an initial value 0.

On the other hand, when the accelerator pedal is not depressed, when the brake pedal is depressed, and when the vehicle speed VSP is smaller than or equal to the stop expected speed VEZERO#, the routine proceeds to the step S8 wherein the timer starts counting up the counted time DTZERO by a predetermined value TSTEP# (DTZERO=DTZERO(previous value)+TSTEP#). The counting for adding the predetermined value TSTEP# to the previous counted time DTZERO(previous value) by each control cycle is executed only when all of the above three conditions are satisfied.

At a step S9 following to the execution of the step S7 or S8, the control unit 15 decides whether the counted time DTZERO is greater than or equal to a predetermined decision time TMZERO#. When the decision at the step S9 is affirmative, the routine proceeds to a step S10 wherein a vehicle stop flag #FVZERO is set at 1 (#FVZERO=1). When the decision at the step S9 is negative, the routine proceeds to a step S11 wherein the vehicle stop flag #FVZERO is set at 0 (#FVZERO=0). The decision time TMZERO# includes an extremely low-speed coasting time DTOFSET# and is determined at a predetermined time period within a range from 1 to 2 second upon taking account of a deviation due to the accuracy of the vehicle speed sensor 10.

When the vehicle stop flag #FVZERO is set at 1 (#FVZERO=1), the control unit 15 commands the fuel injectors 25 to stop the fuel injection. That is, by setting the vehicle stop flag #FVZERO at 1, the engine 1 is stopped.

With the thus arranged automatic engine-stop control apparatus of the first embodiment, in a condition that the detected vehicle speed VSP becomes smaller than or equal to the stop expected speed VEZERO# by depressing the brake pedal and releasing the acceleration pedal and the depression of the brake pedal is continued in order to stop :Lo running of the vehicle V, when the predetermined stop decision time TMZERO# elapses from the moment that the detected vehicle speed VSP becomes smaller than or equal to the stop expected speed VEZERO#, the control unit 15 decides that the actual vehicle speed is zero and therefore the vehicle V is stopped, as shown in FIG. 3. Therefore, the decision that the vehicle V is stopped is accurately executed, and it becomes possible to accurately execute the stop of the engine 1.

That is, the automatic engine-stop control apparatus of the first embodiment according to the present invention detects that the detected vehicle speed VSP becomes smaller than the stop expected speed VEZERO# just before the vehicle V is stopped. If the braking is continued after the apparatus detects that the detected vehicle speed becomes smaller than the stop expected speed, and if a predetermined time period elapses from the moment that the detected vehicle speed reaches the stop expected speed, this apparatus decides that the actual vehicle speed is zero and stops the engine 1 on the basis of this vehicle stop decision. This arrangement of the first embodiment according to the present invention enables the engine 1 to be accurately stopped according to the stop of the vehicle V.

Even if a driver of the vehicle V momentarily weakens the braking just before the vehicle V is stopped so as to smoothly stop the vehicle, the apparatus of the first embodiment according to the present invention accurately decides the stop of the vehicle V because the vehicle stop decision time is set to include the extremely low-speed coasting time corresponding to the braking-weakened running period.

Accordingly, even if the accuracy of the vehicle speed sensor 10 is not high, the apparatus of the first embodiment smoothly stops the engine 1 according to the stop of the vehicle V so as to prevent shocks caused by stopping the engine 1 only based on the detection value of the vehicle speed sensor 10 of the conventional method. This arrangement according to the present invention prevents the driver from having the discomfort of receiving this shock and improves the reliability of the automatic stop of the engine 1.

On the other hand, the vehicle speed will temporally become smaller than or equal to the stop expected speed when the vehicle runs on a climbing road even if the acceleration pedal is depressed. However, the automatic engine-stop control of the first embodiment according to the present invention is arranged to decide that the vehicle V is stopped when the acceleration pedal is released. Accordingly, even if the detected vehicle speed becomes smaller than or equal to the stop expected speed during a climbing road running, the apparatus according to the present invention controls the engine 1 to rotate on, and therefore the preferable drivability is maintained.

In this embodiment, it is preferable that the stop expected speed VEZERO# is set to be as small as possible within a range where the vehicle speed sensor 10 can detect. Since the stop expected speed VEZERO# is set at a vehicle speed just before the vehicle has just been stopped, a generally constant value is provided to an extremely short time period from the moment that the vehicle speed becomes smaller than or equal to the stop expected speed VEZERO# to the moment that the vehicle V is stopped. Further, if the stop expected speed VEZERO# is set at a further small value, it becomes possible to further decease a fluctuation of the time period to the vehicle stop and to set the stop decision time TMZERO# at a suitable value. This enables the apparatus to decide the stop of the vehicle V at further early time.

Figure 5:
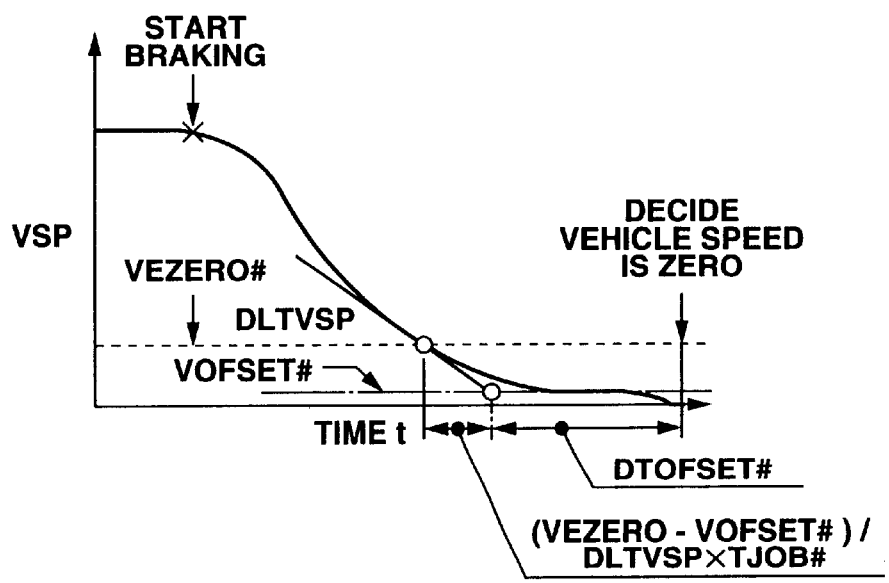
FIG. 5 is a time chart explaining the operation of the vehicle employing the automatic engine stop control apparatus of the second embodiment.
Figure 4:
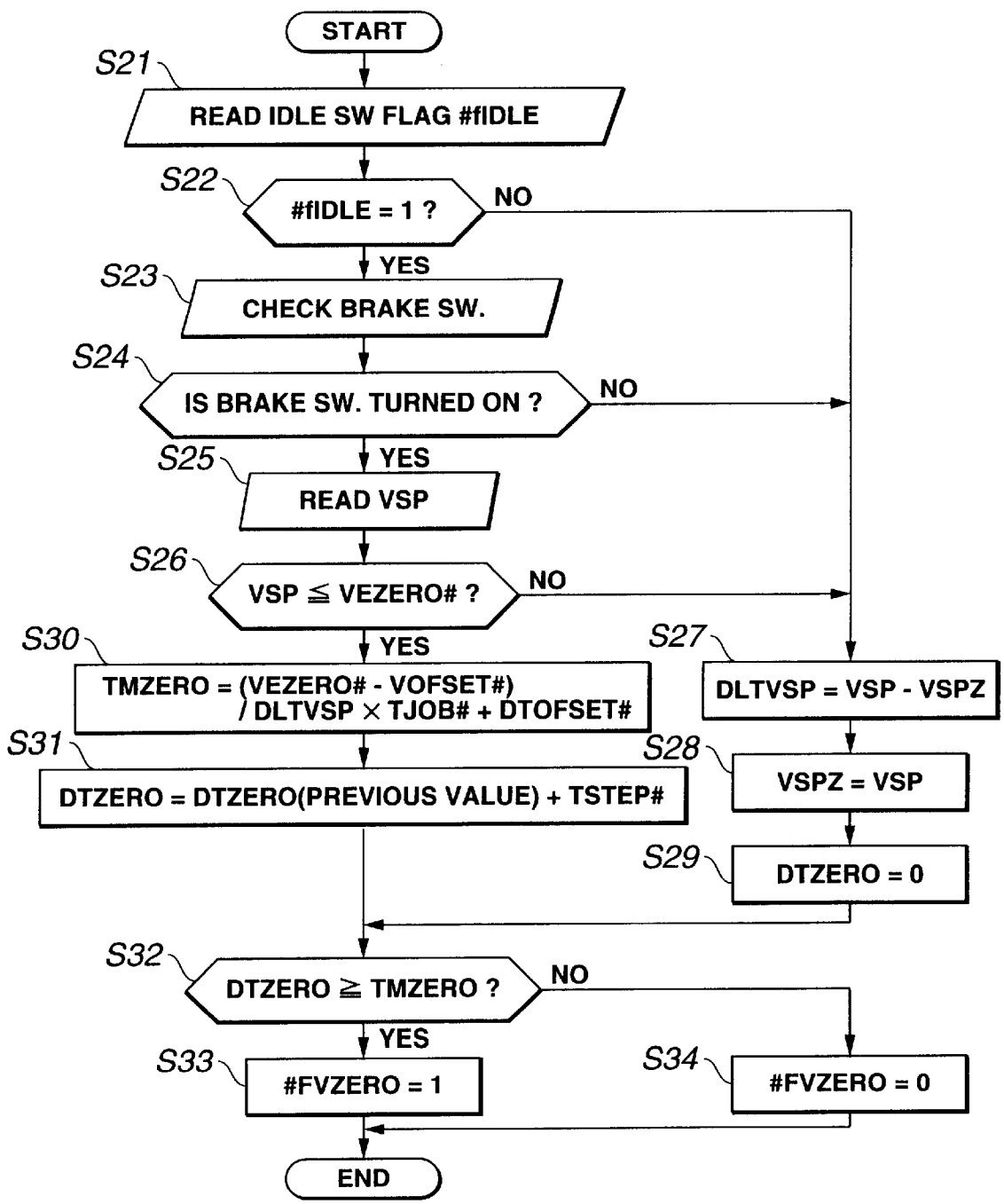
FIG. 4 is a flowchart showing an automatic engine stop control employed in the second embodiment according to the present invention.

Referring to FIGS. 4 and 5, there is shown a second embodiment of the automatic engine stop control apparatus according to the present invention. This second embodiment is arranged to obtain a deceleration at a moment just before the detected vehicle speed becomes smaller than or equal to the stop expected speed and to determine the stop decision time on the basis of the obtained deceleration. A flowchart of FIG. 4 schematically shows a control program of the automatic engine-stop control. The mechanical and electrical construction of the second embodiment is the same as that of the first embodiment as shown in FIG. 1. Therefore, the explanation thereof is omitted herein.

With reference to the flowchart of FIG. 4, the control procedure of the second embodiment will be discussed hereinafter.

At a step S21, the control unit 15 reads the idle SW flag #fIDLE.

At a step S22, the control unit 15 decides the engine 1 is put in idling condition or not. When the decision at the step S22 is affirmative (#fIDLE=1), the routine proceeds to a step S23. When the decision at the step S22 is negative (#fIDLE=0), the routine proceeds to a step S27.

At the step S23, the control unit 15 checks a condition of the brake switch 12.

At the step S24, the control unit 15 decides whether the brake switch 12 is turned on or not. When the decision at the step S24 is affirmative, the routine proceeds to a step S25. When the decision at the step S24 is negative, the routine proceeds to the step S27.

At the step S25 following to the affirmative decision at the step S24, the control unit 15 reads the vehicle speed VSP from the vehicle speed sensor 10.

At the step S26, the control unit 15 decides whether or not the detected vehicle speed VSP is smaller than or equal to the stop expected speed VEZERO#. When the decision at the step S26 is affirmative, the routine proceeds to a step S30. When the decision at the step S26 is negative, the routine proceeds to the step S27.

At the step S27 following to the negative decision at the step S22, S24 or S26, the control unit 15 calculates a vehicle deceleration DLTVSP by subtracting a previous vehicle speed VSPZ from a present vehicle speed VSP (DLTVSP= VSP0−VSPZ).

At a step S28 following to the execution of the step S27, the control unit 15 updates the previous vehicle speed VSPZ with the present vehicle speed VSP (VSPZ=VSP).

At a step S29 following to the execution of the step S28, the control unit 15 resets the counted time DTZERO of the timer is reset at zero (DTZERO=0).

That is, when the accelerator pedal is depressed, when the brake pedal is not depressed, or when the detected vehicle speed VSP is greater than the predetermined stop expected speed VEZERO#, the routine proceeds to the step S27 to update the previous vehicle speed VSPZ and reset the counted time DTZERO of the timer.

On the other hand, when the accelerator pedal is not depressed, when the brake pedal is depressed, and when the vehicle speed VSP is smaller than or equal to the predetermined stop expected speed VEZERO#, the routine proceeds to the step S30 wherein the stop decision time TMZERO is determined by using the following equation (1):

$$TMZERO = (VEZERO\# - VOFSET\#)/DLTVSP \times TJOB\# + DTOFSET\#$$

where TJOB# is a calculation cycle, and VOFSET# is a braking-weakened vehicle speed ensured by momentarily weakening braking force just before the vehicle is stopped.

At a step S31 following to the execution of the step S30, the control unit 15 starts to count up the counter time DTZERO of the timer.

That is, the stop decision time TMZERO is obtained by adding the extremely low-speed coasting time DTOFSET# to a time period from a moment of the stop expected speed VEZERO# to a moment when a driver momentarily weakens the braking so that the vehicle speed is set at the braking-weakened vehicle speed VOFSET#. The extremely low-speed coasting time DTOFSET# is set at a constant value.

When the accelerator pedal is not depressed, when the brake pedal is depressed, and when the detected vehicle speed VSP is smaller than or equal to the predetermined vehicle speed VEZERO#, the counted time DTZERO of the timer is incremented by a predetermined value TSTEP# at every control cycle (DTZERO=DTZERO(previous value)+ TSTEP#).

At a step S32 following to the execution of the step S31 or S29, the control unit 15 decides whether the counted time DTZERO of the timer is greater than or equal to the stop decision time TMZERO or not. When the decision at the step 32 is affirmative, that is, when the counted time DTZERO of the timer becomes greater than or equal to the stop decision time TMZERO, the control unit 15 decides that the actual vehicle speed is zero and the vehicle V is stopped. Then, the control unit 15 sets the vehicle stop flag #FVZERO at 1 (#FVZERO=1) at a step S33. Further, when the vehicle stop flag #FVZERO is set at 1 (#FVZERO=1), the control unit 15 commands the fuel injectors 25 to stop the fuel injection. That is, by setting the vehicle stop flag #FVZERO at 1, the engine 1 is stopped.

When the decision at the step S32 is negative, the routine proceeds to a step S34 wherein the vehicle stop flag #FVZERO is set at 0 (#FVZERO=0).

With the thus arranged automatic engine-stop control apparatus of the second embodiment according to the present invention, as shown in FIG. 5, on the basis of the deceleration DLTVSP at the moment just before the vehicle speed VSP detected by the vehicle speed sensor 10 becomes smaller than or equal to the stop expected speed VEZERO#, when the elapsed time reaches the sum of a first time period and a second time period where the first time period is a time period from the moment when the detected vehicle speed becomes smaller than or equal to the stop expected speed VEZERO# to the moment when the detected vehicle speed is decreased to the braking-weakened speed and the second time period is the extremely low-speed coasting time DTOFSET#, it is decided that the actual vehicle speed is zero and the vehicle V is stopped.

That is, the timing for momentarily weakening the braking for stopping the vehicle V is estimated by the deceleration DLTVSP at the moment just before the detected vehicle speed becomes smaller than or equal to the stop expected speed VEZERO#. Further, when the elapse of the extremely low-speed coasting time DTOFSET# from this estimated period is detected, it is decided that the actual vehicle speed is zero and the vehicle V is stopped. Therefore, the decision of the vehicle stop is further accurately executed, and the accuracy of the stop decision is further improved by the second embodiment.

Figure 6:
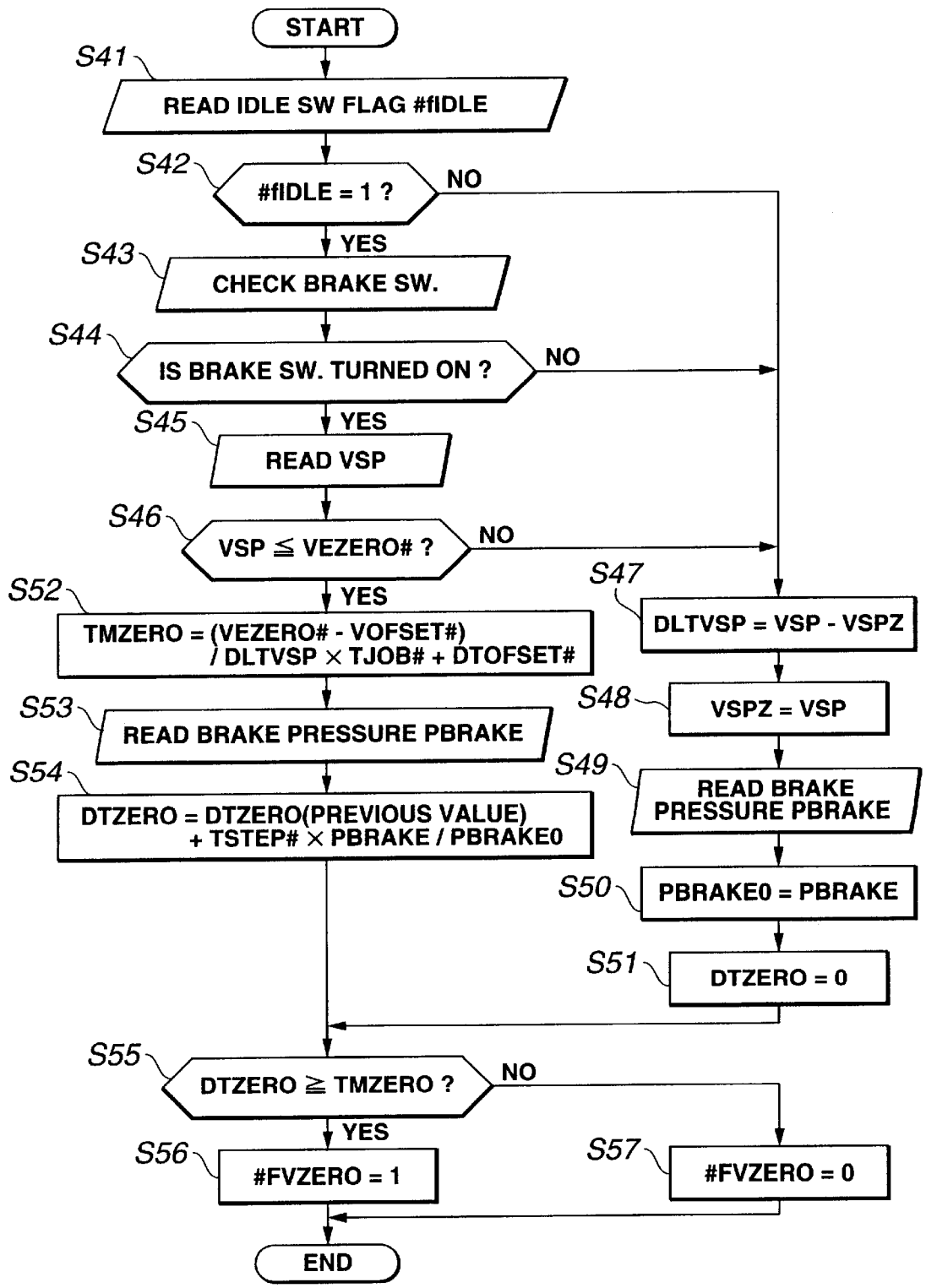
FIG. 6 is a flowchart showing an automatic engine stop control employed in the third embodiment according to the present invention.
Figure 7:
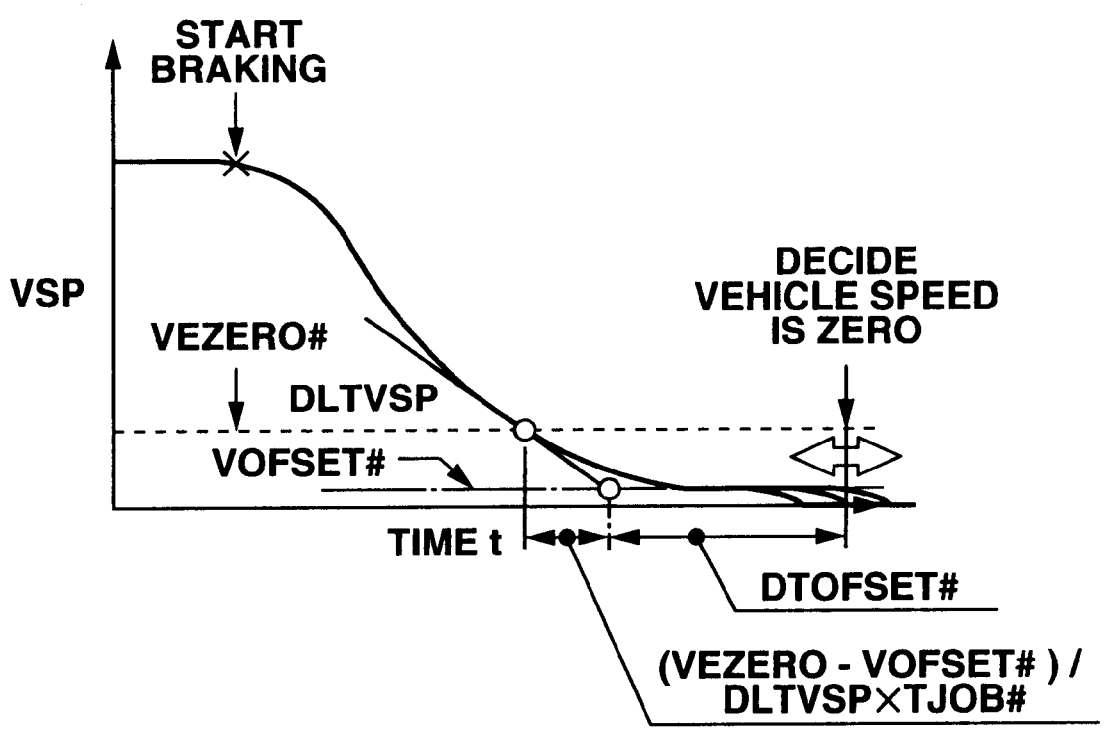
FIG. 7 is a time chart explaining the operation of the vehicle employing the automatic engine stop control apparatus of the third embodiment.

Referring to FIGS. 6 and 7, there is shown a third embodiment of the automatic engine stop control apparatus according to the present invention. The third embodiment is arranged to vary the stop decision time on the basis of the brake pressure PBRAKE detected by the brake pressure sensor 20. A flowchart of FIG. 6 schematically shows a control program of the automatic engine-stop control of the third embodiment. The mechanical and electrical construction of the third embodiment is the same as that of the first embodiment as shown in FIG. 1. Therefore, the explanation thereof is omitted herein.

With reference to the flowchart of FIG. 6, the control procedure of the second embodiment will be discussed hereinafter.

At a step S41, the control unit 15 reads the idle SW flag #fIDLE.

At a step S42, the control unit 15 decides whether the engine 1 is put in idling condition or not. When the decision at the step S42 is affirmative, the routine proceeds to a step S43. When the decision at the step S42 is negative, the routine proceeds to a step S47.

At the step S43, the control unit 15 checks a condition of the brake switch 12.

At the step S44, the control unit 15 decides whether the brake switch 12 is turned on or not. When the decision at the step S44 is affirmative, the routine proceeds to a step S45. When the decision at the step S44 is negative, the routine proceeds to the step S47.

At the step S45 following to the affirmative decision at the step S44, the control unit 15 reads the vehicle speed VSP from the vehicle speed sensor 10.

At the step S46, the control unit 15 decides whether or not the detected vehicle speed VSP is smaller than or equal to the stop expected speed VEZERO#. When the decision at the step S46 is affirmative, the routine proceeds to a step S52. When the decision at the step S46 is negative, the routine proceeds to the step S47.

At the step S47 following to the negative decision at the step S42, S44 or S46, the control unit 15 calculates a vehicle deceleration DLTVSP by subtracting a previous vehicle speed VSPZ from a present vehicle speed VSP (DLTVSP= VSP0−VSPZ).

At a step S48 following to the execution of the step S47, the control unit 15 updates the previous vehicle speed VSPZ with the present vehicle speed VSP (VSPZ=VSP).

At a step S49 following to the execution of the step S48, the control unit 15 reads the brake hydraulic pressure PBRAKE from the brake pressure sensor 20.

At a step S50, the control unit 15 sets a reference value PBRAKE0 at the detected brake pressure PBRAKE (PBRAKE0=PBRAKE).

At a step S51, the control unit 15 resets the counted time DTZERO of the timer is reset at zero (DTZERO=0).

That is, when the accelerator pedal is depressed, when the brake pedal is not depressed, or when the detected vehicle speed VSP is greater than the predetermined stop expected speed VEZERO#, the routine proceeds to the step S47 to update the previous vehicle speed VSPZ, to set the reference value PBRAKE0 at the detected brake pressure PBRAKE (PBRAKE0=PBRAKE) and to reset the counted time DTZERO of the timer.

On the other hand, when the accelerator pedal is not depressed, when the brake pedal is depressed, and when the vehicle speed VSP is smaller than or equal to the predetermined vehicle speed (stop expected speed) VEZERO#, the routine proceeds to the step S52 wherein the stop decision time TMZERO is determined by using the equation (1), as explained in the second embodiment.

At a step S53 following to the execution of the step S52, the control unit 15 reads the detected brake pressure PBRAKE from the brake pressure sensor 20.

At a step S54 following to the execution of the step S54, the control unit 15 starts to count up the counted time DTZERO of the timer. That is, when the accelerator pedal is not depressed, when the brake pedal is depressed, and when the vehicle speed VSP is smaller than or equal to the predetermined stop expected speed VEZERO#, the counted time DTZERO of the timer is basically incremented by a predetermined value TSTEP# at every control cycle. However, the predetermined value TSTEP# is corrected by a ratio (PBRAKE/PBRAKE0) of the present brake pressure PBRAKE with respect to the reference brake hydraulic pressure PBRAKE0. Accordingly, the counted time DTZERO is counted up by a corrected value TSTEP#× PBRAKE/PBRAKE0, and therefore the counted time DTZERO is obtained by the following equation (2):

$$DTZERO=DTZERO(\text{previous value})+TSTEP\#\times PBRAKE/PBRAKE0 \qquad (2)$$

That is, when the brake pedal is further depressed as compared with the depressed condition at the moment the detected vehicle speed VSP becomes smaller than or equal to the stop expected speed VEZERO#, the incremented value TSTEP#×PBRAKE/PBRAKE0 is increased to accelerate the counting of the timer. When the depression of the brake pedal is decreased as compared with the depressed condition at the moment the detected vehicle speed VSP becomes smaller than or equal to the stop expected speed VEZERO#, the incremented value TSTEP#×PBRAKE/ PBRAKE0 is decreased to decelerate the counting the timer.

At a step S55 following to the execution of the step S51 or S54, the control unit 15 decides whether the counted time DTZERO is greater than or equal to a predetermined decision time TMZERO. When the decision at the step S55 is affirmative, the routine proceeds to a step S56 wherein the vehicle stop flag #FVZERO is set at 1 (#FVZERO=1). When the decision at the step S54 is negative, the routine proceeds to a step S57 wherein the vehicle stop flag #FVZERO is set at 0 (#FVZERO=0). When the vehicle stop flag #FVZERO is set at 1 (#FVZERO=1), the control unit 15 commands the fuel injectors 25 to stop the fuel injection. That is, by setting the vehicle stop flag #FVZERO at 1, the engine 1 is stopped.

With the thus arranged automatic engine-stop control apparatus of the third embodiment according to the present invention, as shown in FIG. 7, the counting speed of the time DTZERO of the timer is variably determined after the detected vehicle speed VSP becomes smaller than or equal to the stop expected speed VEZERO#. On the basis of the elapsed time of the timer, it is decided that the actual vehicle speed is zero and the vehicle V is stopped. More specifically, when the braking force caused by the braking is increased, the time period to the stop of the vehicle is shortened. Therefore, in such a braking increased condition, the stop decision is advanced. In contrast, when the braking force is decreased, the time period to the stop of the vehicle V is elongated. Therefore, in such a braking decreased condition, the stop decision is retarded. Accordingly, even if the braking operation is changed after the detected vehicle speed VSP becomes smaller than or equal to the stop expected speed VEZERO#, the automatic engine-stop control apparatus of the third embodiment according to the present invention generally simultaneously executes the decision that the actual vehicle speed is zero and the decision that the vehicle V is stopped in response to the braking operation. This further improves the accuracy of the stop decision of the vehicle V.

The entire contents of Japanese Patent Applications No. 11-32438 filed on Feb. 10, 1999 in Japan are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. An automatic engine-stop control apparatus for a vehicle, comprising:
    a vehicle speed sensor outputting a vehicle speed indicative signal;
    a brake pedal depression sensor outputting a signal indicative that a brake pedal is depressed; and
    a control unit coupled to said vehicle speed sensor and said brake pedal depression sensor, said control unit being programmed to decide that the detected vehicle speed is smaller than or equal to a predetermined stop expected speed when the brake pedal is depressed, and to decide that the vehicle is stopped when a predetermined time period elapses from a moment that the detected vehicle speed becomes smaller than or equal to the predetermined stop expected speed and when the depression of the brake pedal is continued.

2. An automatic engine-stop control apparatus as claimed in claim 1, wherein said control unit previously stores the predetermined time period therein.

3. An automatic engine-stop control apparatus as claimed in claim 1, wherein said control unit is programmed to determine a low-speed coasting time generated by decreasing the depression of the brake pedal just before the vehicle is stopped, and to determine the predetermined time on the basis of the low-speed coasting time.

4. An automatic engine-stop control apparatus as claimed in claim 1, wherein said control unit is programmed to calculate a deceleration of the vehicle at a moment just before the detected vehicle speed becomes smaller than or equal to the predetermined stop expected speed and to determine the predetermined time period on the basis of the calculated value of the deceleration.

5. An automatic engine-stop control apparatus as claimed in claim 1, further comprising a braking force detector for detecting a braking force caused by the depression of the brake pedal, said control unit being coupled to said braking force detector and determining the predetermined time period on the basis of the detected braking force.

6. An automatic engine-stop control apparatus as claimed in claim 5, wherein said braking force detector includes a brake pressure sensor which detects a brake hydraulic pressure of a braking apparatus of the vehicle.

7. An automatic engine-stop control apparatus as claimed in claim 1, further comprising an acceleration opening sensor for outputting a signal indicative of the depression amount, said control unit being coupled to said acceleration opening sensor and being programmed to stop deciding that the vehicle is stopped when the acceleration pedal is depressed.

8. An automatic engine-stop control apparatus as claimed in claim 1, wherein said control unit commands a fuel injector of the engine to stop injecting fuel.

9. An automatic engine-stop control apparatus for a vehicle, comprising:
    vehicle speed detecting means for detecting a vehicle speed of the vehicle;
    braking detecting means for detecting that a braking of the vehicle is executed by a driver of the vehicle;
    vehicle speed deciding means for deciding that the detected vehicle speed is smaller than or equal to a predetermined stop expected speed; and
    running stop deciding means for deciding that the vehicle is stopped when a predetermined time period elapses from a moment that the detected vehicle speed becomes smaller than or equal to the predetermined stop expected speed and when the braking is continued.

10. A method for executing an automatic stop of the engine, the method comprising:
    detecting a vehicle speed of a vehicle;
    detecting that a braking of the vehicle is executed by a driver of the vehicle;
    deciding that the vehicle speed is smaller than or equal to a predetermined stop expected speed when the braking is executed; and
    deciding that the vehicle is stopped when a predetermined time period elapses from a moment that the vehicle speed becomes smaller than or equal to the predetermined stop expected speed and when the braking is continued.

11. A vehicle-stop deciding apparatus of a vehicle, comprising:
    a vehicle speed sensor outputting a vehicle speed indicative signal;
    a brake pedal depression sensor outputting a signal indicative that a brake pedal is depressed; and
    a control unit coupled to said vehicle speed sensor and said brake pedal depression sensor, said control unit being programmed to decide that the detected vehicle speed is smaller than or equal to a predetermined stop expected speed when the brake pedal is depressed, and to decide that the vehicle is stopped when a predetermined time period elapses from a moment that the detected vehicle speed becomes smaller than or equal to the predetermined stop expected speed and when the depression of the brake pedal is continued.

12. A method for deciding a stop of a vehicle, the method comprising:
    detecting a vehicle speed of the vehicle;
    detecting that a braking of the vehicle is executed by a driver of the vehicle;
    deciding that the vehicle speed is smaller than or equal to a predetermined stop expected speed when the braking is executed; and
    deciding that the vehicle is stopped when a predetermined time period elapses from a moment that the vehicle speed becomes smaller than or equal to the predetermined stop expected speed and when the braking is continued.

* * * * *